United States Patent [19]
Davidson

[11] Patent Number: 5,379,544
[45] Date of Patent: Jan. 10, 1995

[54] WEEDLESS LURE

[76] Inventor: Lawrence P. Davidson, 29 Smallwood St., Indian Orchard, Mass. 01151

[21] Appl. No.: 102,890

[22] Filed: Aug. 6, 1993

[51] Int. Cl.$^6$ ............................................. A01K 85/00
[52] U.S. Cl. .................................. 43/42.24; 43/42.28; 43/42.41
[58] Field of Search ................. 43/42.24, 42.28, 42.41, 43/42.1

[56] References Cited

U.S. PATENT DOCUMENTS

| | | | |
|---|---|---|---|
| 2,971,285 | 2/1961 | Murawski | 43/42.28 |
| 3,199,244 | 8/1965 | Frederiksen, Sr. | 43/42.28 |
| 3,731,419 | 5/1973 | Candy | 43/42.41 |
| 4,619,069 | 10/1986 | Strickland | 43/42.28 |
| 4,771,567 | 9/1988 | Cannon | 43/42.28 |
| 4,790,100 | 12/1988 | Green, Sr. | 43/42.28 |
| 4,873,783 | 10/1989 | McGahee et al. | 43/42.24 |
| 4,920,686 | 5/1990 | McGahee et al. | 43/42.24 |
| 4,953,319 | 9/1990 | Kasper et al. | 43/42.24 |

Primary Examiner—Kurt Rowan

[57] ABSTRACT

An artificial fishing lure including a hollow, easily penetrable dorsal fin which conceals the point of a hook and deflects weeds.

4 Claims, 3 Drawing Sheets

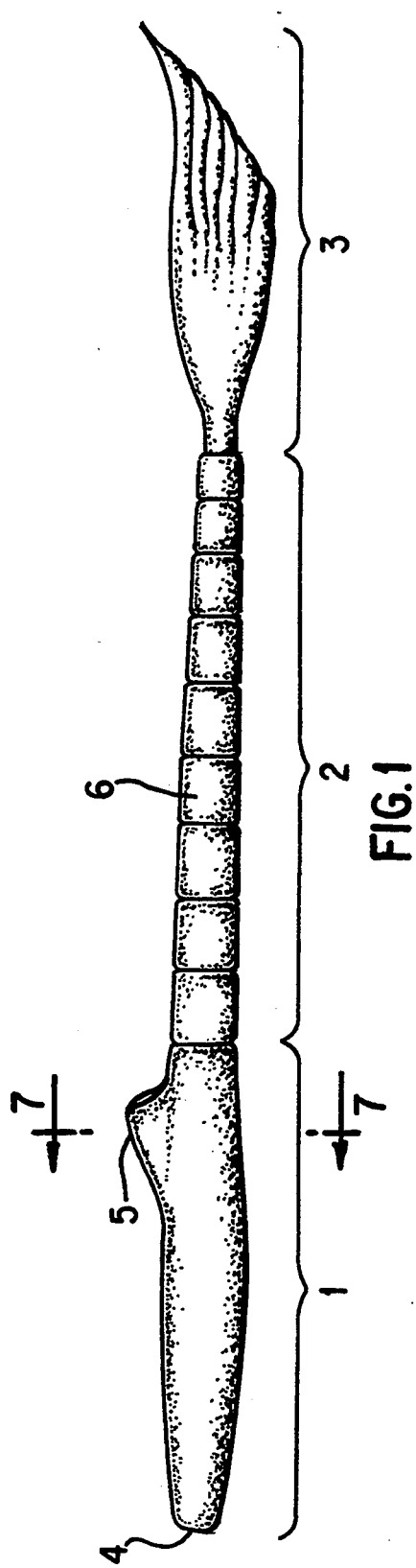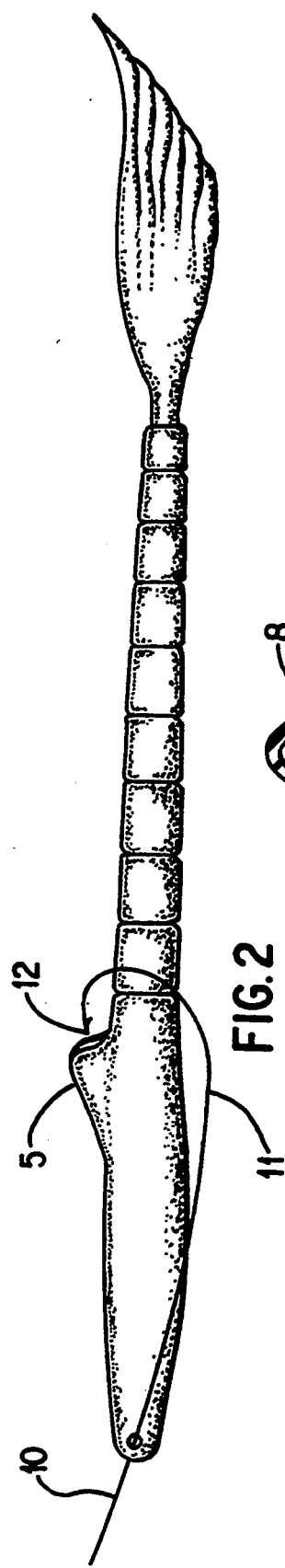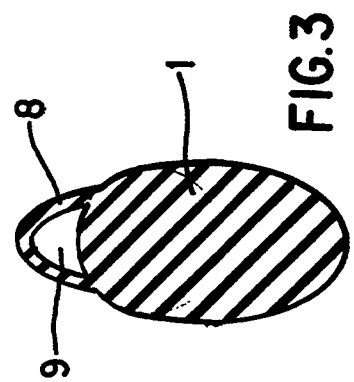

WEEDLESS LURE

BACKGROUND OF THE INVENTION

One of the oldest and most frustrating problems which confronts fisherman is the probability that the tug on the end of his fishing line is the engagement of a weed or other unwanted catch rather than a fish. This is the most common predicament a fisherman finds himself in, given the fact that many fish are to be found in areas that contain weeds or other obstacles. If the point of a fish hook is exposed and dragged through the water, it is far more likely to snag debris than a fish.

Several attempts to render a lure weedless have been patented. Some contained mechanical weedguards that were required to be set not unlike a mousetrap. However, sometimes the tension holding the weedguard in place would be too great and the mechanism would not disengage when struck by a fish. Conversely, if the tension were too weak, the mechanism would disengage without a fish strike. These types of lures are no longer readily available on the market.

Other more recent attempts to create a weedless lure include Hardwicke, III, in U.S. Pat. No. 4,312,148, which was a typical plastic worm containing an appendage intended to act as a weedguard. The appendage was made of a PVC plasticol with a low penetration resistance. The main problem with this type of lure is that it required the fisherman to impale the appendage axially with the point of the hook and then push the hook deep enough into the appendage to cover the exposed part of the hook. This was not a simple task. Because the appendage had a low penetration resistance and had a preferred thickness of only 4 to 5 mm, the process of impaling the appendage frequently resulted in unintentional tearing the walls of the appendage and/or impaling one's finger.

A common practice of fisherman is to "Texas Rig" an artificial worm. A Texas Rigged worm passes the hook through the nose of the worm leaving the shank substantially outside of the worm and then passes the point radially back into the worm. This method leaves the point inside the worm in an attempt to make the lure weedless. The problems with Texas Rigs are that the shank protrudes a relatively great distance from the body of the worm giving it a very unnatural look and feel. It also requires the fisherman to attempt the difficult task of positioning the point of the hook close enough to the outer skin of the worm such that the point can penetrate the surface in the event of a fish bite.

Several other attempts have been made to solve snagging problems. However, no prior patents have been completely successful and none have suggested the simple, but novel features of the present invention.

SUMMARY OF THE INVENTION

An objective of the present invention is to improve the art of weedless fishing lures by decreasing the potential for snagging unwanted debris.

Another objective is to make a weedless lure which is easy to set.

An additional objective is to create a weedless lure which resembles a natural swimming prey of fish.

A still further objective of the invention is to form the lure such that it is streamlined.

BRIEF DESCRIPTION OF THE DRAWINGS

Several drawings are attached which aid in the disclosure and description of the present invention:

FIG. 1 is a profile of the artificial lure in the preferred eel embodiment of the invention;

FIG. 2 is a profile view of the artificial lure set with a hook;

FIG. 3 is a longitudinal cross section of the artificial lure of FIG. 2 taken across line 7—7;

DETAILED DESCRIPTION OF THE PREFERRED EMBODIMENT

Figure 4:
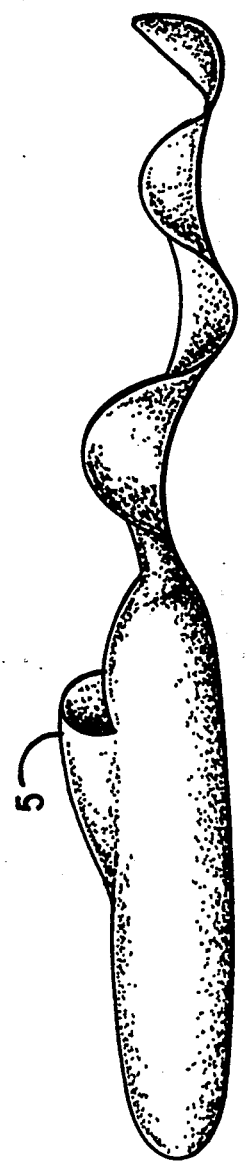
FIG. 4 represents an alternative embodiment of the invention in the form of an eel.

The body of the invention is shown in FIG. 1. In the preferred embodiment, the entire lure is comprised of a flexible synthetic polymer which is standard in the prior art. The lure is made up of three sections, 1, 2, 3. Section 1 is smooth and extends approximately one third the length of the lure, beginning at the nose 4 and ending distally from the opening to the hollow dorsal fin 5. The second section 2 is comprised of a varying number of segments 6 depending on the length of the lure. The segments are pinched at each end to enable free swimming movement when the lure is pulled through the water. The third section 3 of the lure functions as a tail. It fans slightly from the end proximate to the second section to the distal end such that the distal end is greater in height. The tail section is flat, being no more than 5 mm wide while being up to 3 cm in height in the preferred embodiment. The first two sections of the lure are slightly greater in height than they are in width.

A hollow dorsal fin 5 rises from the first section beginning approximately two thirds of the distance from the nose at approximately a 30° angle. The fin is enclosed on all, but the distal side. The open distal end of the fin is between 1 and 2 cm from the proximate end of the second section. The walls of the fin 8 are at least 2 mm in thickness, but no more than 4 mm so that they are easily compressed by the jaws of a fish, but not by passing debris, such as weeds. The walls of the fin form a hollow triangular cavity 9.

The lure is set by attaching a hook to a line 10, piercing the nose of the lure with the hook, passing the hook longitudinally through the first section and exiting the ventral skin of the lure through the first section. The first segment of the second section is then impaled on the ventral side, the hook exits the dorsal side, curves back toward the nose of the lure and the point and barb 12 come to rest just distal of the hollow fin. The configuration of the set hook is illustrated in FIG. 2. The existence of the fin allows the shank of the hook 11 to lie along the ventral side of the lure such that it is unlikely to entangle debris. The hollow fin acts as a weed and debris deflector, but is easily compressed by a fish to allow for engagement with the hook.

Figure 5:
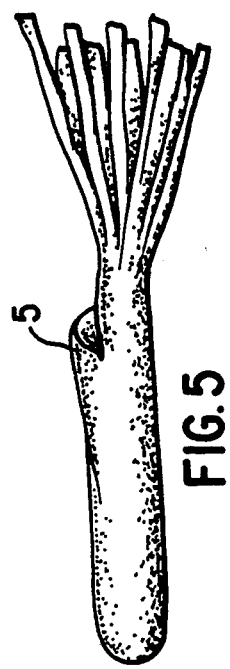
FIG. 5 represents an alternate embodiment of the invention in the form of a tubee.
Figure 6:
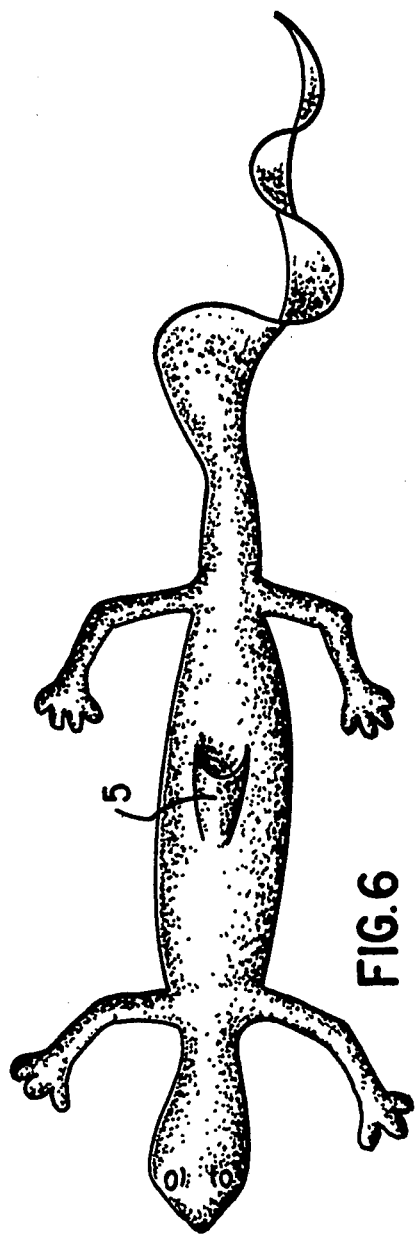
FIG. 6 represents an alternate embodiment of the invention in the form of a lizard.
Figure 7:
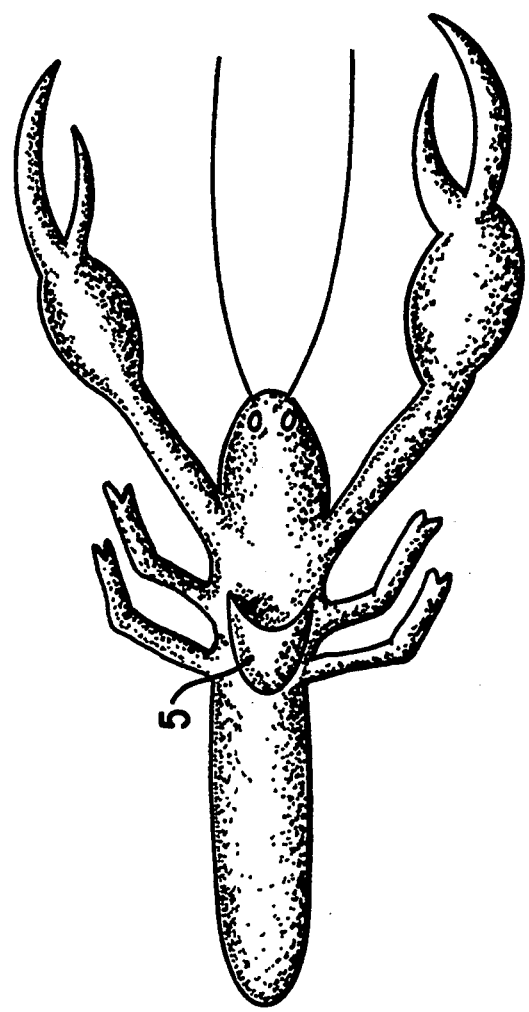
FIG. 7 represents an alternate embodiment of the invention in the form of a crawfish.

The improvements to artificial lures demonstrated by the present invention can be incorporated into various embodiments such as those illustrated in FIGS. 4–7. Other embodiments may be made obvious by the disclosure and illustrations of this invention. Therefore, the disclosure is not intended to be limiting. The scope of the invention is intended to be limited only by the following claims.

What I claim is:

1. An artificial fishing lure comprising a flexible, preferably polymeric substance having at least a three sections (A) the first section being smooth and substantially cylindrical or slightly in the shape of an oval and containing a hollow dorsal fin, said fin being enclosed on all sides except being open on the side nearest the second section of the lure and having walls up to 4 mm in thickness; (B) the second section containing several segments pinched at each end; and (C) a third section being substantially flat.

2. The fishing lure set forth in claim 1 wherein said hollow fin elevates from the first section at an angle between 30° and 45° beginning approximately two thirds of the distance from the nose.

3. The fishing lure set forth in claim 1 wherein said hollow fin is formed by walls of up to 3 mm in thickness.

4. A fishing lure which contains a dorsal fin as set forth in claim 1, wherein said lure resembles a worm.

* * * * *